United States Patent [19]

Grimshaw

[11] Patent Number: 4,954,204
[45] Date of Patent: Sep. 4, 1990

[54] PRESSER MEMBER FOR CONTOURED SURFACES

[75] Inventor: Michael N. Grimshaw, Milford, Ohio

[73] Assignee: Cincinnati Milacron Inc., Cincinnati, Ohio

[21] Appl. No.: 275,822

[22] Filed: Nov. 25, 1988

[51] Int. Cl.⁵ ............................................. B32B 31/08
[52] U.S. Cl. ...................................... 156/361; 29/125; 156/411; 156/574
[58] Field of Search ............... 156/523, 574, 411–413; 29/125, 113.1, 113.2

[56] References Cited

U.S. PATENT DOCUMENTS

| | | | |
|---|---|---|---|
| 4,052,246 | 10/1977 | Albareda | 156/412 |
| 4,341,584 | 7/1982 | Czernichowsky | 29/125 X |
| 4,351,688 | 9/1982 | Weiss | 156/358 |
| 4,601,775 | 7/1986 | Grone | 156/523 |

Primary Examiner—David Simmons
Assistant Examiner—James J. Engel, Jr.
Attorney, Agent, or Firm—Thomas M. Farrell

[57] ABSTRACT

Thin plates are stacked across the width of a composite tape strip. A pressurized membrane extends along the top edges of the plates, biasing the plates down against the tape strip. The membrane yields to vertical movement of the plates sliding relative to one another, in response to contour changes occurring across the tape strip.

5 Claims, 6 Drawing Sheets

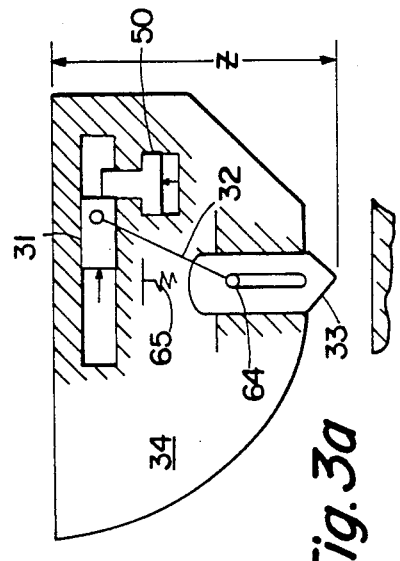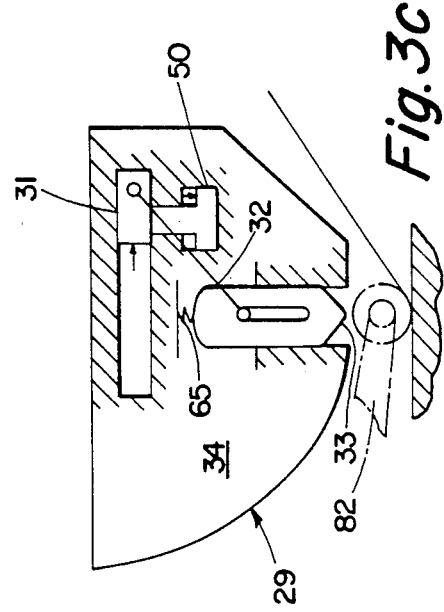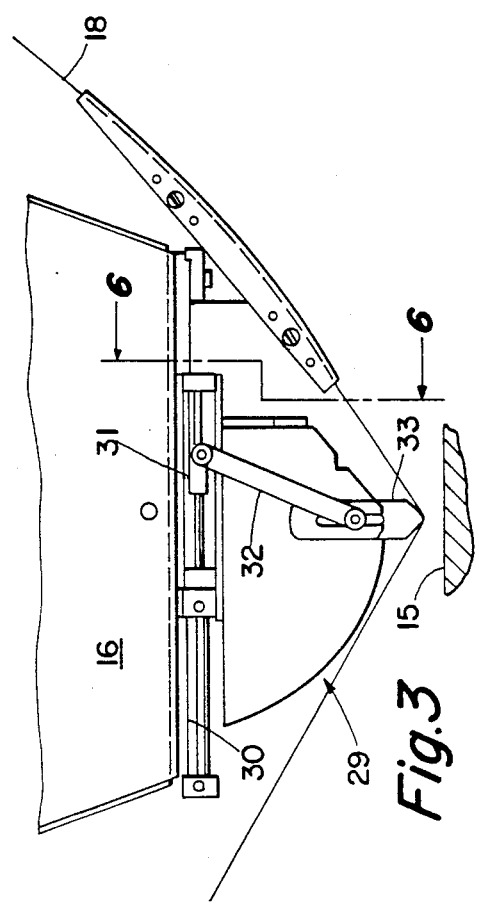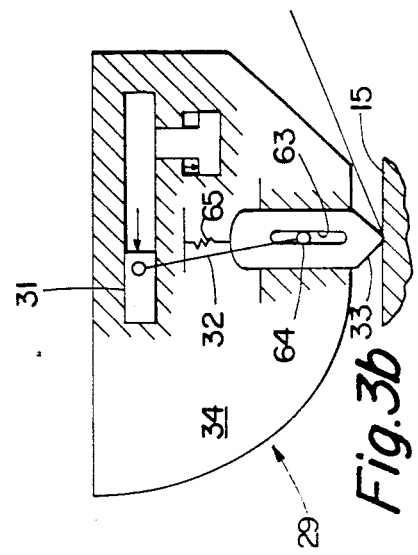

PRESSER MEMBER FOR CONTOURED SURFACES

BACKGROUND OF THE INVENTION

1 Field of Invention

The invention relates generally to machines for creating laminated structures of reinforced composites, where the laminar plys are detruded by a presser member, for example, a roller or skidding shoe. In particular, the invention relates to machines for creating laminated structures where the laydown surface has a changing contour, especially across the presser member face.

2 Prior Art Information

It is known in machines for producing composites structures, for example, composite tape laying machines, that the tape laying head is usually oriented around the tape laying path, and the presser member face will thereby remain generally parallel to the tape surface. Where the tape laydown surface experiences contour changes across the presser member face, it has been known in the art to provide an elastomeric tire to a roller, and to provide a similarly deformable skin to a presser member shoe.

U.S. Pat. No. 4,601,775 illustrates a tape presser member assembly which has an internal force divider mechanism carried by an axle for dividing the frame pressing force, i.e., a radial force of the axle directed against the work surface, into at least two separate radial components, where the components are manifested through movable solid elements (spherical ball joints) into a distortable elastomeric presser strip which spans the movable members Thus, the assembly may universally adapt to a variety of surface contours occuring across the presser member face, i e., across the width of a structural tape.

U.S. Pat. No. 4,351,688, depicts a tape laying head which slits tape longitudinally into equal width strips, and each strip may be selectively severed to create approximate forms with the severed ends. The head contains a segmented roller system whereby individual rollers may be impressed on their respective strips until the strip length runs out, at which time the respective roller is pulled upward. The system provides for control of pressure on the tails of cut segments. However, the rollers are individually powered by air cylinders, and are automatically lifted by springs which bias the rollers in an upward direction, away from the laydown surface. The rollers are not compliant to ride on a variety of surface contours across the tape width, but rather are either "on", or "off".

Applicant has identified a need for a presser member which can smoothly conform to a changing surface contour across a presser member face which has a relatively simple mechanism obviating the need for individual segment power units, and which has a relatively low inertia to permit rapid acceleration and deceleration of the presser member segments while the tape laying head can "catch up" when its large mass is able to respond to surface contour changes.

SUMMARY OF THE INVENTION

It is an object of the present invention to provide a presser member which can smoothly conform to contour changes occurring across the presser member face.

It is also an object of the present invention to provide a compact presser member assembly, adaptable to changing contours, which has relatively low inertia and therefore high response time to encountered contour changes.

It is another object of the present invention to provide a simplified segmented presser assembly which is compact and has a common biasing means for acting on all the segments.

The invention is shown embodied in a machine for applying fiber reinforced composite material to a worksurface, for example, a tape laying machine, where the machine has a head movable on a base frame in response to means for controlling the movement of the head along plural axes with respect to the surface while applying material, wherein an improved presser member for the head comprises:

a presser member housing affixable to the tape laying head;

a plurality of thin wafer-like plates, having flat parallel opposite faces, where the plates are stacked in adjacent face-to-face array in the presser member housing, and where the plates have a common workpiece presser edge extending from the housing and a biasing portion extending into the housing;

means for independently guiding the plates in parallel movements with respect to the housing; and a bladder spring means in the housing for yieldably biasing the plates away from the housing, where the spring means includes a fluid chamber and a flexible membrane enclosing the chamber and extending into contact with the biasing portion of the plates, wherein the chamber may be pressurized with a fluid medium, for example air, as the presser edges are run in contact with a workpiece, and the plates may thereby slip parallel to one another, to permit the presser edges to conform to workpiece contours.

BRIEF DESCRIPTION OF THE DRAWINGS

FIG. 3 is a side elevational view of the tape laying head of FIG. 2, with a presser member for contoured surfaces.

FIGS. 3a, 3b, and 3c are diagrammatic views of the presser member of FIG. 3.

PRIOR ART

Figure 1:
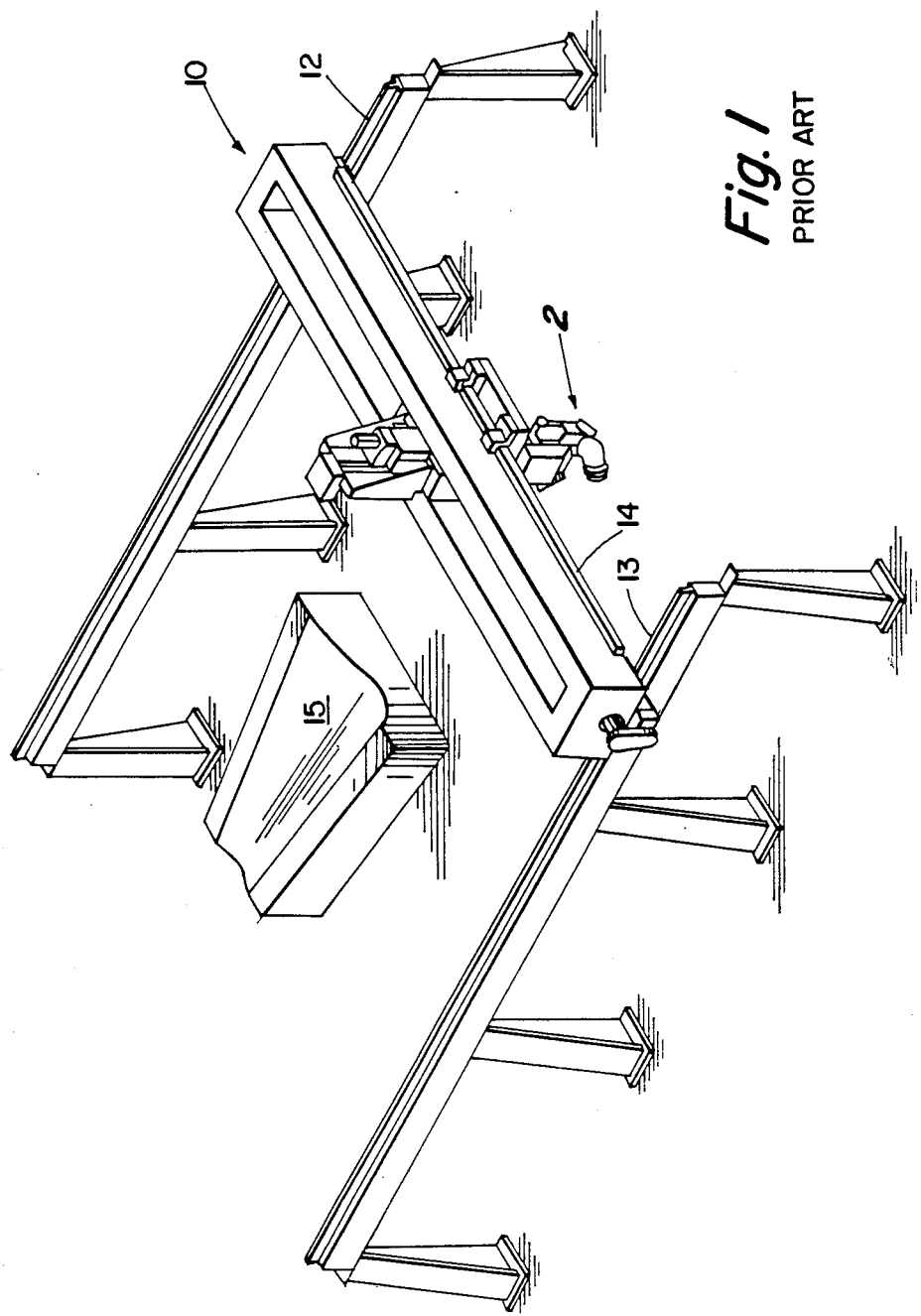
FIG. 1 is a perspective view of a tape laminating machine of the prior art.

FIG. 1 of the drawings depicts a high rail gantry type tape laying machine 10 wherein a tape laying head 11 is transported coordinately on side rails 12, 13 and transverse gantry rails 14. A contoured tape laydown surface 15 is positionable with respect to the tape laying head 11 to form laminated composite structures.

Figure 2:
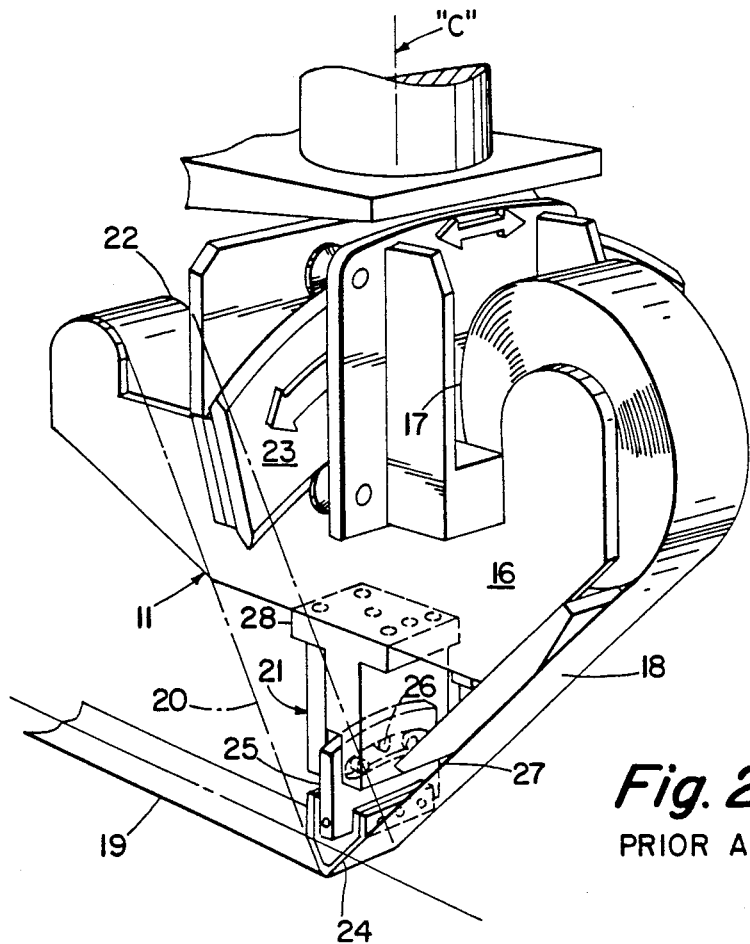
FIG. 2 is a perspective view of a tape laying head taken in the direction of arrow 2 of FIG. 1.

The close-up perspective view of FIG. 2 illustrates the tape laying head 11 as comprising, in part, a main frame 16 supporting a tape supply reel 17 carrying a tape structure 18 comprised of filamentous composite tape 19 and, optionally, a backing tape paper 20. The tape structure 18 is trained across a tape presser member assembly 21 and backing paper tape 20 is accumulated on a take-up reel 22. The rails 12, 13, and 14, are generally horizontal, and the entire tape head is rotatable around a vertical axis "C". The tape laying head main frame 16 is rotatable on a circular way system 23 about the tape laying path axis "A" (generally horizontal). The tape laying head 11 is movable in the vertical direction. i.e., "Z" axis movement, to adapt to changing mold heights along the tape path. A presser shoe assembly 24, is depicted as part of the tape presser member assembly 21 and, while the shoe assembly 24 may be carried in a variety of shoe support structures, the embodiment depicted illustrates the shoe assembly 24 as being carried in a cam plate 25 forming a yoke which also is rotatable around axis "A", independent of the tape head main frame rotation. Basically, the cam plate rotation is effected by a circular track 26 concentric with the circular way system 23, supported on cam followers 27 in the T-block 28 of the presser member assembly 21. Details of the FIG. 2 structure may be had by referring to U.S. Pat. No. 4,601,775 assigned to Cincinnati Milacron Inc.

DESCRIPTION OF THE PREFERRED EMBODIMENT

With reference to FIG. 3, the tape head main frame 16 is shown with an improved presser member 29 bolted to its bottom surface 30. The presser member 29 will be shown in more detail in connection with FIG. 4, but it can be seen that the mechanism is, basically, a four-bar linkage of the double slider type, i.e., wherein a horizontal slider 31 is connected by a link 32 to a vertical slider (shoe plate stack 33).

Here it should be noted that while certain attitudinal references may be employed, i.e., "horizontal", "vertical", and the like, such reference is only for the convenience of the reader, and the machine structure is not so limited; those skilled in the art will appreciate that the spatial ordinates of the machine may be varied to suit the task within the scope of the invention.

Figure 4:
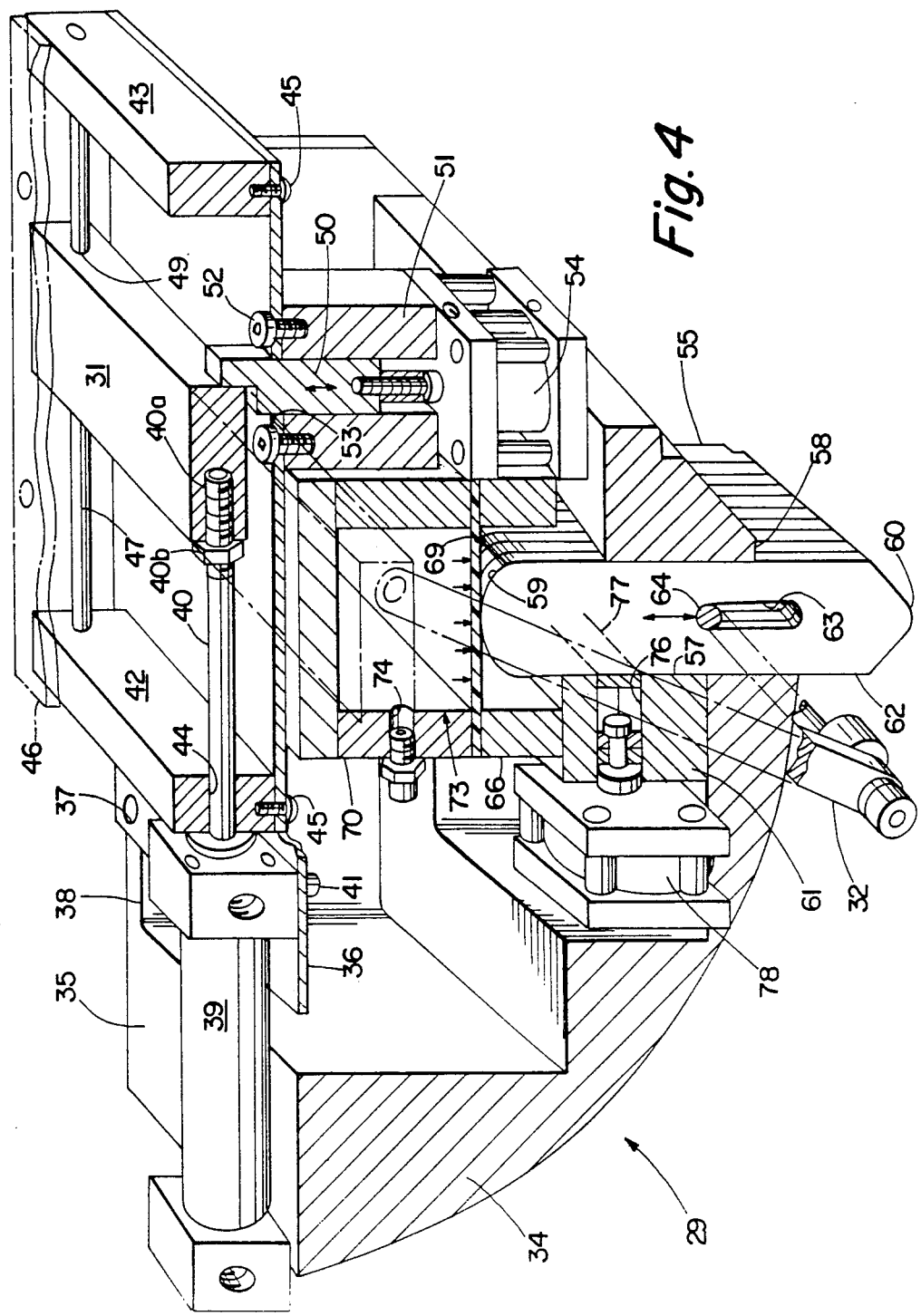
FIG. 4 is an enlarged perspective view, in section, of the presser member of FIG. 3.

FIG. 4 depicts the tape head presser member 29 of FIG. 3, illustrating a housing 34, which is quarter-rounded at its lower rear surface and hollowed-out to accommodate detail pieces. The top surface 35 of the housing 34 has a flat housing plate 36 bolted thereto by button-head screws 37; the housing plate 36 spans the main opening 38 and serves as a mounting for a centrally located air cylinder 39, having a single piston rod 40 extending frontwardly. The cylinder 39 is secured to the top of the plate by several screws 41. Immediately adjacent the front of the cylinder 39 is a first guide block 42 extending across the width of the plate 36 and housing 34, and a similar, second guide block 43 is located at the front end of the plate 36, the difference in the two blocks 42, 43 being that the first block 42 has a clearance hole 44 for the piston rod 46. The blocks 42, 43 are held to the plate 36 by a plurality of screws 45 extending from underneath, and a mounting plate 46 is, in turn, secured to the upper surface of the blocks 42, 43. The mounting plate 46 serves as a mounting member for fastening the assembled presser member 29 to the bottom surface 30 of the main frame 16 of FIG. 3 by cap screws 47. The guide blocks 42, 43 have a pair of parallel guide rods 48 extending therebetween, one at each side of the assembly (see FIG. 6), and a horizontal slider 31 rides with bushings 49 on the guide rods 48. The threaded end 40a of the piston rod 40 is received in the slider 31 and affixed thereto by a jam nut 40b.

The slider 31 has three specific positions:

(1) fully-retracted, i.e., residing against the first guide block 42 as the piston rod 40 is fully retracted into its cylinder 39;

(2) forwardly-advanced against a latch finger 50 (as shown in FIG. 4); and, (3) fully-advanced against the second guide block 43 (as the latch finger 50 is retracted).

The latch finger 50 slides in a vertical guide block 51 which is secured by screws 52 to the lower surface of the housing plate 36. The latch finger 50 extends through an aperture 53 in the plate 36 and is powered in vertical directions by a compact fluid cylinder unit 54 secured to the bottom of the guide block 51.

Figure 6:
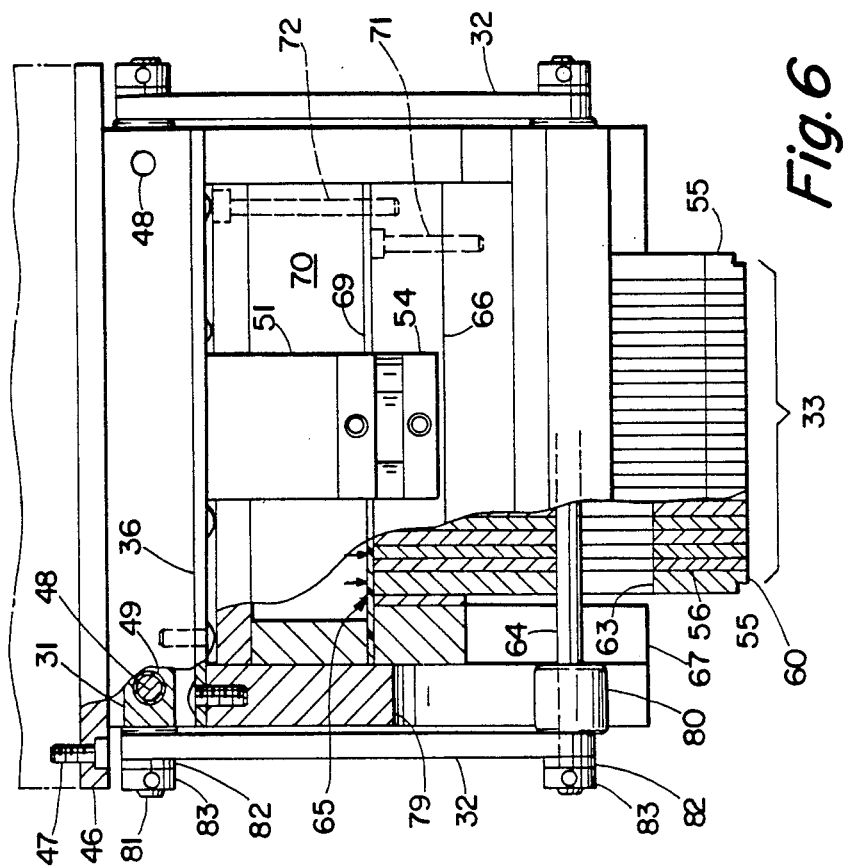
FIG. 6 is a front view, in partial section, of the presser member of FIG. 3.

The working unit (shoe plate stack 33) for contacting a tape surface is comprised of a plurality of parallel-faced wafer-like shoe plates 55, 56 (see FIGS. 4 and 6), stacked across the tape width, and guided in a slot 57 in the lower surface 58 of the housing 34. The shoe plates 55, 56 have a convex top edge 59 and a rounded bottom workpiece presser edge 60. The two outer shoe plates 55 are twice as thick as the inner shoe plates 56, to provide side stiffness, but the outer shoe plates 55 are thinned-down at their bottom edges 60 to the same thickness as the inner shoe plates 56. The shoe plates 55, 56 are backed up by a brake block 61 situated in the housing 34, which serves as an additional guide for their rear edges 62, the brake block 61 being in line with the slot 57 in the housing 34. A vertical elongate slot 63, of common size, is provided in line through all of the plates 55, 56, and a control rod 64 extends horizontally, from side-to-side through all of the slots 63. The control rod 64 is connected to a link 32 at each of the outer ends (see also FIG. 6). and the top of the links 32 are pivotally connected to the opposite side edges of the slider 31. In the position shown in FIG. 4, i.e.. with the slider 31 stopped against the latch finger 50, the upper edges of the slots 63 will rest on the control rod and the bottom edges 60 of the shoe plates 55, 56 will be in line as shown in FIG. 6. This position is an alignment, or "null", position, where the bottom edges 60 of the plates 55, 56 may thus be programmed in a known relation to the machine coordinates, in anticipation of a tape laying move.

Figure 5:
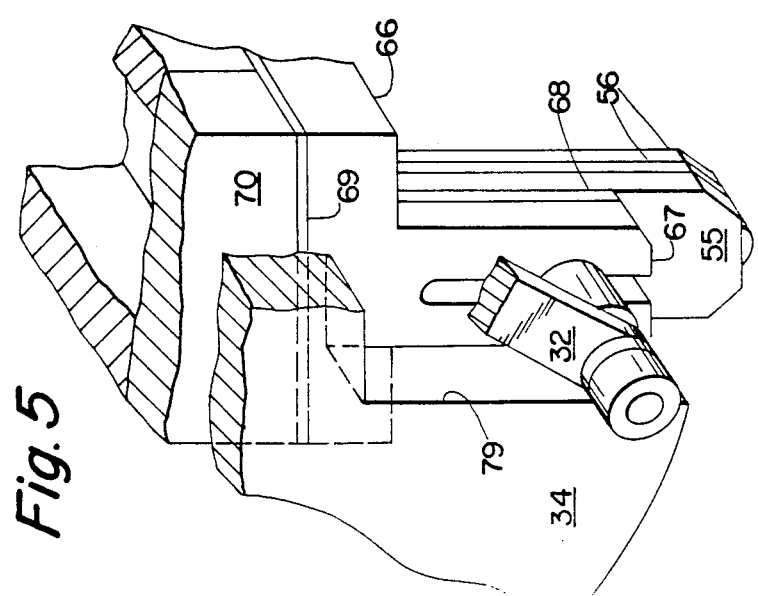
FIG. 5 is a partial section, in perspective, of the presser member control mechanism of FIG. 3.

In order to provide a downward biasing force to all of the plates 55, 56, a bladder spring 65 has been devised, which comprises an open box frame 66, having clearance around the periphery of the shoe plate stack 33, and which has a bifurcated portion 67 extending down at each side (see FIGS. 5 and 6), which serves both to guide the control rod 64 and to provide guidance for the overall width of the plate stack 33. The inner faces of the bifurcated portions 67 are faced with a shim stock 68 which is fitted to the width of the shoe plate stack 33 to accommodate sliding movement of the plates 55, 56. The box frame 66 has a flexible membrane 69 extending across its entire upper surface, in contact with, and spanning, the top edge 59, or biasing portion, of the plates 55, 56. The membrane 69 is secured in place by a fabricated box 70 which is fully enclosed except for a single open side, which is placed against the membrane 69; the box 70 is secured in assembly with the membrane 69, box frame 66 and housing 34 by screws 71, 72, so that a closed chamber 73 is formed immediately above the membrane 69. The box 70 is provided with an orifice 74 and fluid conductive fitting 75 so that air or other fluid medium may be introduced to the chamber 73 and, thus, the membrane 69 may be pressurized to provide a downward biasing force to the entire stack of plates 55, 56. The membrane 69 is yieldable, to accommodate surface contour variances which will cause the plates 55, 56 to shift vertically, relative to one another, as the tape 19 is laid.

It may be desired at certain instances to lock the plate stack 33 in a particular contoured state, inhibiting further relative vertical movement between the shoe plates 55.56. For such instances, the brake block 61 has a slot 76 machined across its face adjacent the shoe plates 55, 56. A friction bar, or brake pad 77, extends in the slot 76 across the rear edges 62 of the shoe plates 55, 56, and is actuated by a compact fluid cylinder 78 which moves the brake pad 77 between "on" and "off" positions. The brake may be useful when the presser member 29 is operating near the edge of a mold, and all plates are not supported by a mold surface 15 beneath the tape 19; in such instance, the tape 19 may be pushed over the edge of the mold in an unwanted fashion, if the shoe plates 55, 56 are not arrested.

Referring to FIG. 6, the control rod 64 is seen in contact with the upper edge of the shoe plate slot 63, and larger slots 79, in the sides of the housing 34, are fitted with a tubular spacer 80 so the control links 32 will be properly spaced. The control links 32 are received over the rod 64 and the upper pivot pins 81 extending from the slider 31, and washers 82 and locking collars 83 are placed on the rod 64 and pins 81.

Operation of the Presser Member

FIG. 3a is a diagrammatic view of the elements of FIG. 3, showing the housing 34 supporting the vertically-movable shoe plate stack 33, with the latch finger 50 "up" and the slider 31 moved to the right, against the latch finger 50. The control link 32 is shown connected to the control rod 64 which evens out, or "nulls", all plates 55, 56 at a known dimension, Z', and the biasing force provided by the membrane 69 is depicted as a bladder spring 65 reacting against the top edge 59 of the shoe plates 55, 56. The position of the elements in FIG. 3a is for programming all vertical, or Z-axis dimensions. i.e predicting where touchdown of the presser shoe plates 55, 56 will occur.

FIG. 3b depicts the elements of FIG. 3a in an alternate position, where the latch finger 50 is "down", and the slider 31 is moved leftwardly to the fully-retracted position. In this position, it is expected that the presser member 29 has now landed down on a tape 19 which is backed up by the mold laydown surface 15, and the control link 32 will move the horizontal control rod 64 to an intermediate position in the shoe plate slot 63, so that the control rod 64 will no longer affect the vertical position of the plates 55, 56. The bladder spring 65 biases the entire shoe plate stack 33 against the tape 19, and the shoe plates 55, 56 can float in compliance with contour variances occurring across the tape width.

FIG. 3c depicts the latch finger 50 retracted, the slider 31 now fired to the fully-advanced position, all the way to the right, where the control link 32 now pulls the control rod 64 to a new raised position, where the vertically-movable shoe plate stack 33 is fully retracted upwardly into the housing 34, compressing the bladder spring 65. This position may be very useful for permitting the use of auxiliary equipment, for example, the tail compacting roller 82 shown in phantom, which is not part of this invention, but details of which may be had by reference to U.S. Pat. No. 4,557,783, assigned to Cincinnati Milacron Inc.

Alternate Embodiment

The foregoing description of the preferred embodiment covers a general usage of the presser member 29, wherein the entire shoe plate stack 33 may be impressed against a tape 19 or, in certain instances, against a peelable tape backing 20. Such use is frequently directed to epoxy-type composite tapes, which are tacky and tend to follow mold contours with relative ease.

Figure 7:
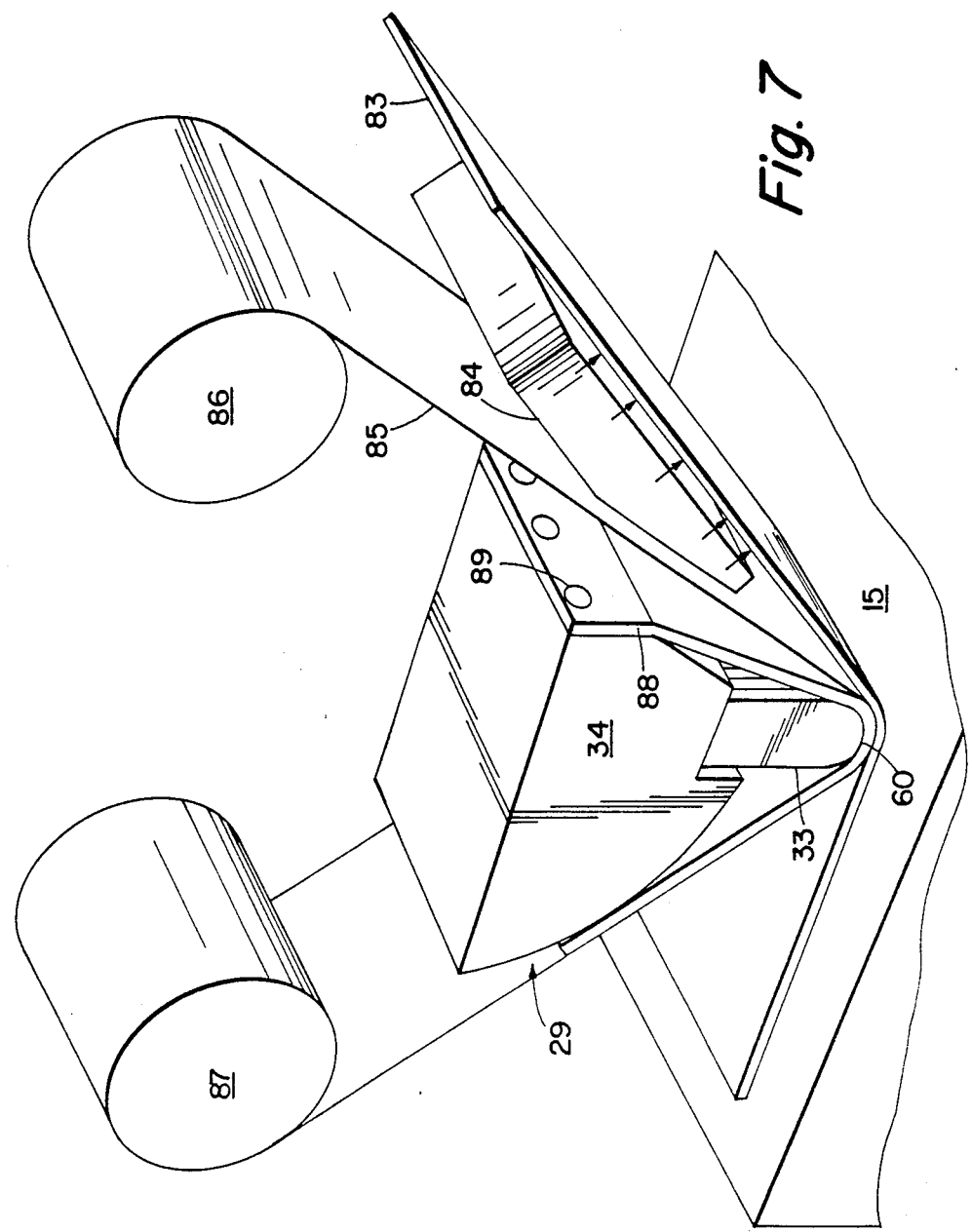
FIG. 7 is a perspective view of an alternate embodiment of the invention.

However, thermoplastic tapes 83 are frequently used without backing paper 20, and tend to be dry and very boardy, or stiff. Consequently, heaters 84 are often employed to soften thermoplastic tape prior to laydown. In such cases it may desirous that the projecting edge 60 of the shoe plate stack 33 not be impressed directly against the softened tape 83 but, rather, a separate paper sheet 85, having its own supply and takeup reels 86, 87, may be interposed between a thermoplastic tape 83 and the presser member 29 to prevent plowing of the tape 83. FIG. 7 depicts such an arrangement, with still an additional feature; the tape presser member 29 is provided with a flexible sheet 88, which is secured to the front edge of the housing 34 by a plurality of screws 89, and then trained down and around the shoe plate stack 33 to smooth out the slightly-stepped contours seen across the presser edges 60. It has been found that silicon rubber may be successfully employed as a flexible sheet 88 when laying thermoplastic tape 83. The paper sheet 85 inserted between the flexible sheet 88 and thermoplastic tape 83 also acts as a heat barrier to protect the flexible sheet 88 from degrading as the tape 83 is heated. Thermoplastic tapes 83 used in the construction of aircraft parts have a softening temperature in the range of 750 degrees F., which could be destructive to a flexible silicon rubber sheet 83 used to even out the presser member edges 60.

Alternate Embodiment

Figure 8:
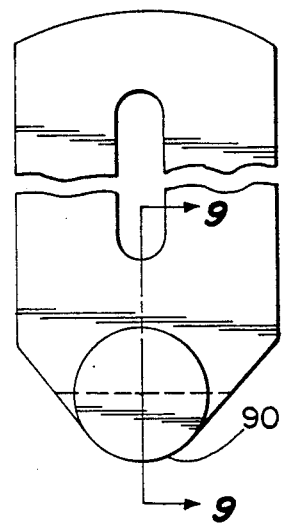
FIG. 8 is a side elevational view of an alternate embodiment of the invention.
Figure 9:
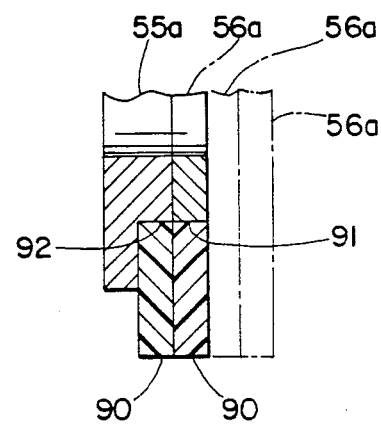
FIG. 9 is an elevational section taken along the line 9-9 of FIG. 8.

FIGS. 8 and 9 depict an alternate embodiment of the invention, where a roller 90 of even thickness is inserted in each of the outer and inner plates 55a, 56a. The roller 90 is a solid disc captive in a close-fitting bore 91 machined through each of the inner plates 56a. The outer plates 55a each have a blind hole 92 receiving a roller 90, thus captivating the roller stack.

It will be appreciated that a variety of materials may be suitable for the presser member plates 55, 56 and rollers 90: For example, low friction TEFLON (DuPont TM) has been used for the one-piece plates, while brass plates with DELRIN (DuPont TM) rollers have also been successfully used for the two-piece assemblies.

While the invention has been shown in connection with a preferred embodiment, and several alternate embodiments, it is not intended that the invention be so limited. Rather, the invention extends to all such designs and modifications as come within the scope of the appended claims.

What is claimed is:

1. In a machine for applying fiber reinforced composite material to a work surface, wherein the machine has:
    a base frame located in a predetermined position with respect to the surface;
    a head, movably mounted on the base frame, for applying the material; and means for controlling relative movement of the head with respect to the surface, along plural axes, while applying material, an improved presser member for the head, wherein the improvement comprises:

a presser member housing, including means for affixing said housing to said head;

a plurality of wafer-like plates, having flat parallel opposite faces, stacked in adjacent face-to-face array in said housing,
  said plates each having a common workpiece presser edge extending from said housing, and
  said plates each also having a biasing portion extending into said housing;

means for independently guiding said plates in parallel movements with respect to said housing;

bladder spring means in said housing for yieldably biasing said plates away from said housing; and power means for controlling common movement of said plates at predetermined times, wherein as said workpiece presser edges are relatively run over material in contact with a work surface, said plates may slip parallel to one another to permit said presser edges to conform to workpiece contours.

2. In a machine for applying fiber reinforced composite material to a work surface, wherein the machine has:

a base frame located in a predetermined position with respect to the surface;

a head, movably mounted on the base frame, for applying the material; and means for controlling relative movement of the head with respect to the surface, along plural axes, while applying material;

an improved presser member for the head, wherein the improvement comprises:

a presser member housing, including means for affixing said housing to said head;

a plurality of wafer-like plates, having flat parallel opposite faces, stacked in adjacent face-to face array in said housing,
  said plates each having a common workpiece presser edge extending from said housing, and
  said plates each also having a biasing portion extending into said housing;

means for independently guiding said plates in parallel movements with respect to said housing;

bladder spring means in said housing for yieldably biasing said plates away from said housing, said spring means including:
  a fluid chamber; and
  a flexible membrane enclosing said chamber and extending into contact with said biasing portion of said plates; and power means for controlling parallel movement of said plates at predetermined times, wherein said chamber may be pressurized with a fluid medium as said workpiece presser edges are relatively run over material in contact with a work surface, and said plates may slip parallel to one another to permit said presser edges to conform to workpiece contours.

3. The presser member of claim 1 or 2, wherein said power means includes a null position for aligning said plates when said plates are not in contact with said workpiece surface.

4. The presser member of claim 1 or 2, wherein said power means includes a null position for aligning said plates when said plates are not in contact with said workpiece surface, and said presser member further includes brake means for fixing said plates with respect to one another, and wherein said common workpiece presser edge includes a roller means.

5. The presser member of claim 1 or 2, wherein said power means includes a null position for aligning said plates when said plates are not in contact with said workpiece surface, said presser member further includes brake means for fixing said plates with respect to one another, and wherein said common workpiece presser edge includes a roller means.

* * * * *

UNITED STATES PATENT AND TRADEMARK OFFICE
CERTIFICATE OF CORRECTION

PATENT NO. : 4,954,204
DATED : September 4, 1990
INVENTOR(S) : Michael N. Grimshaw It is certified that error appears in the above-identified patent and that said Letters Patent is hereby corrected as shown below:

At Column 8, line 28, claim 4 should read:

4. The presser member of claim 1 or 2, wherein said power means includes a null position for aligning said plates when said plates are not in contact with said workpiece surface, and said presser member further includes break means for fixing said plates with respect to one another.

Signed and Sealed this

Fifth Day of November, 1991

Attest:

HARRY F. MANBECK, JR.

*Attesting Officer*          *Commissioner of Patents and Trademarks*